US011228724B2

(12) United States Patent
Maruyama et al.

(10) Patent No.: US 11,228,724 B2
(45) Date of Patent: Jan. 18, 2022

(54) IMAGE PROCESSING APPARATUS, IMAGE PROCESSING METHOD, AND COMPUTER-READABLE RECORDING MEDIUM FOR INTERPOLATING PIXEL VALUE OF DETERMINED DEFECTIVE PIXEL TO BE CORRECTED

(71) Applicant: OLYMPUS CORPORATION, Tokyo (JP)

(72) Inventors: Hiroki Maruyama, Hino (JP); Teruaki Yamasaki, Hino (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 17/079,708

(22) Filed: Oct. 26, 2020

(65) Prior Publication Data

US 2021/0044769 A1    Feb. 11, 2021

Related U.S. Application Data

(63) Continuation of application No. PCT/JP2019/016374, filed on Apr. 16, 2019.

(30) Foreign Application Priority Data

Apr. 27, 2018  (JP) .............................. JP2018-087053

(51) Int. Cl.
  *H04N 5/367*  (2011.01)
  *H04N 5/353*  (2011.01)
  *H04N 5/355*  (2011.01)
(52) U.S. Cl.
  CPC .......... *H04N 5/3675* (2013.01); *H04N 5/353* (2013.01); *H04N 5/35581* (2013.01)
(58) Field of Classification Search
  CPC .. H04N 5/3675; H04N 5/353; H04N 5/35581; H04N 5/232
  See application file for complete search history.

(56) References Cited

U.S. PATENT DOCUMENTS

| 8,259,198 B2* | 9/2012 | Cote ...................... H04N 5/359 348/246 |
| 2019/0149757 A1 | 5/2019 | Yamasaki et al. |
| 2019/0238771 A1 | 8/2019 | Maruyama et al. |

FOREIGN PATENT DOCUMENTS

| JP | 2015-223202 A | 12/2015 |
| WO | WO 2017/221376 A1 | 12/2017 |
| WO | WO 2018/020685 A1 | 2/2018 |

OTHER PUBLICATIONS

International Search Report dated Jul. 16, 2019 issued in PCT/JP2019/016374.

* cited by examiner

*Primary Examiner* — Twyler L Haskins
*Assistant Examiner* — Angel L Garces-Rivera
(74) *Attorney, Agent, or Firm* — Scully, Scott, Murphy & Presser, P.C.

(57) ABSTRACT

An image processing apparatus including a processor including hardware, the processor being configured to: detect a defective pixel from among the multiple pixels; calculate a level of a pixel value of the defective pixel; compare the calculated level of the pixel value of the defective pixel with a threshold to determine whether a defective pixel that is stored in a storage is to be corrected, the threshold being determined based on a brightness that is calculated from pixel values close to a defective pixel and on any one of an exposure time of image data corresponding to a defective pixel on which a determination is to be made, a value of gain, and variation in pixel value among pixels surrounding the defective pixel on which a determination is to be made; and interpolate the pixel value of the determined defective pixel that is to be corrected.

7 Claims, 3 Drawing Sheets

IMAGE PROCESSING APPARATUS, IMAGE PROCESSING METHOD, AND COMPUTER-READABLE RECORDING MEDIUM FOR INTERPOLATING PIXEL VALUE OF DETERMINED DEFECTIVE PIXEL TO BE CORRECTED

CROSS-REFERENCE TO RELATED APPLICATIONS

This application is a continuation of PCT international application Ser. No. PCT/JP2019/016374, filed on Apr. 16, 2019 which designates the United States, incorporated herein by reference, and which claims the benefit of priority from Japanese Patent Applications No. 2018-087053, filed on Apr. 27, 2018, incorporated herein by reference.

BACKGROUND

1. Technical Field

The disclosure relates to an image processing apparatus, an image processing method, and a computer-readable recording medium.

2. Related Art

In the related art, an image of a subject is captured using a solid-state image sensor in which multiple pixels that perform photoelectric conversion on received light are arranged in a matrix. In the solid-state image sensor, a pixel defect referred to as a white spot sometimes occurs because of radiation existing in nature, a foreign matter in a film, or the like. For such pixels in which defects occur (referred to as defective pixels below), a technique of detecting a defective pixel and correcting the pixel value of the defective pixel has been proposed (For example, International Publication Pamphlet No. WO 2017/221376).

According to International Publication Pamphlet No. WO 2017/221376, a defective pixel is detected by detecting a possible defect pixel using information on a pixel of interest and pixels surrounding the pixel of interest, calculating an evaluation value of the result of the detection for each frame, and determining whether the possible defective pixel is a defective pixel from the evaluation value. In a conventional process of correcting a defective pixel like that according to International Publication Pamphlet No. WO 2017/221376, a defective pixel is corrected by subtracting the level of a white spot (white spot level) from the pixel value of the defective pixel. According to International Publication Pamphlet No. WO 2017/221376, the white spot level is controlled such that the white spot level gradually turns to a proper level by weighting the white spot level that is calculated in the previous frame with the white spot level that is calculated in the current frame.

SUMMARY

In some embodiments, provided is an image processing apparatus configured to perform processing on image data containing multiple pixel values obtained by performing photoelectric conversion using multiple pixels. The apparatus includes a processor including hardware. The processor is configured to: detect a defective pixel in which a defect occurs from among the multiple pixels; calculate a level of a pixel value of the defective pixel; compare the calculated level of the pixel value of the defective pixel with a threshold to determine whether a defective pixel that is stored in a storage is to be corrected, the threshold being determined based on a brightness that is calculated from pixel values close to a defective pixel and on any one of an exposure time of image data corresponding to a defective pixel on which a determination is to be made, a value of gain, and variation in pixel value among pixels surrounding the defective pixel on which a determination is to be made; and by using pixel values of pixels surrounding the determined defective pixel that is to be corrected, interpolate the pixel value of the determined defective pixel that is to be corrected.

In some embodiments, provided is an image processing method of performing processing on image data containing multiple pixel values obtained by performing photoelectric conversion using multiple pixels. The method includes: detecting a defective pixel in which a defect occurs from among the multiple pixels; calculating a level of a pixel value of the defective pixel; comparing the calculated level of the pixel value of the defective pixel with a threshold to determine whether a defective pixel that is stored in a storage is to be corrected, the threshold being determined based on a brightness that is calculated from pixel values close to a defective pixel and on any one of an exposure time of image data corresponding to a defective pixel on which a determination is to be made, a value of gain, and variation in pixel value among pixels surrounding the defective pixel on which a determination is to be made; and by using pixel values of pixels surrounding the determined defective pixel that is to be corrected, interpolating the pixel value of the determined defective pixel that is to be corrected.

In some embodiments, provided is a non-transitory computer-readable recording medium with an executable program stored thereon. The program is an image processing program of an image processing apparatus configured to perform processing on image data containing multiple pixel values obtained by performing photoelectric conversion using multiple pixels and causes the image processing apparatus to execute: detecting a defective pixel in which a defect occurs from among the multiple pixels; calculating a level of a pixel value of the defective pixel; comparing the calculated level of the pixel value of the defective pixel with a threshold to determine whether a defective pixel that is stored in a storage is to be corrected, the threshold being determined based on a brightness that is calculated from pixel values close to a defective pixel and on any one of an exposure time of image data corresponding to a defective pixel on which a determination is to be made, a value of gain, and variation in pixel value among pixels surrounding the defective pixel on which a determination is to be made; and by using pixel values of pixels surrounding the determined defective pixel that is to be corrected, interpolating the pixel value of the determined defective pixel that is to be corrected.

The above and other features, advantages and technical and industrial significance of this disclosure will be better understood by reading the following detailed description of presently preferred embodiments of the disclosure, when considered in connection with the accompanying drawings.

DETAILED DESCRIPTION

An image processing apparatus, an image processing method, and an image processing program according to embodiments of the disclosure will be described below with reference to the accompanying drawings. The embodiments do not limit the disclosure. In the illustration of the drawings, the same components are denoted with the same reference numbers.

Embodiment

Figure 1:
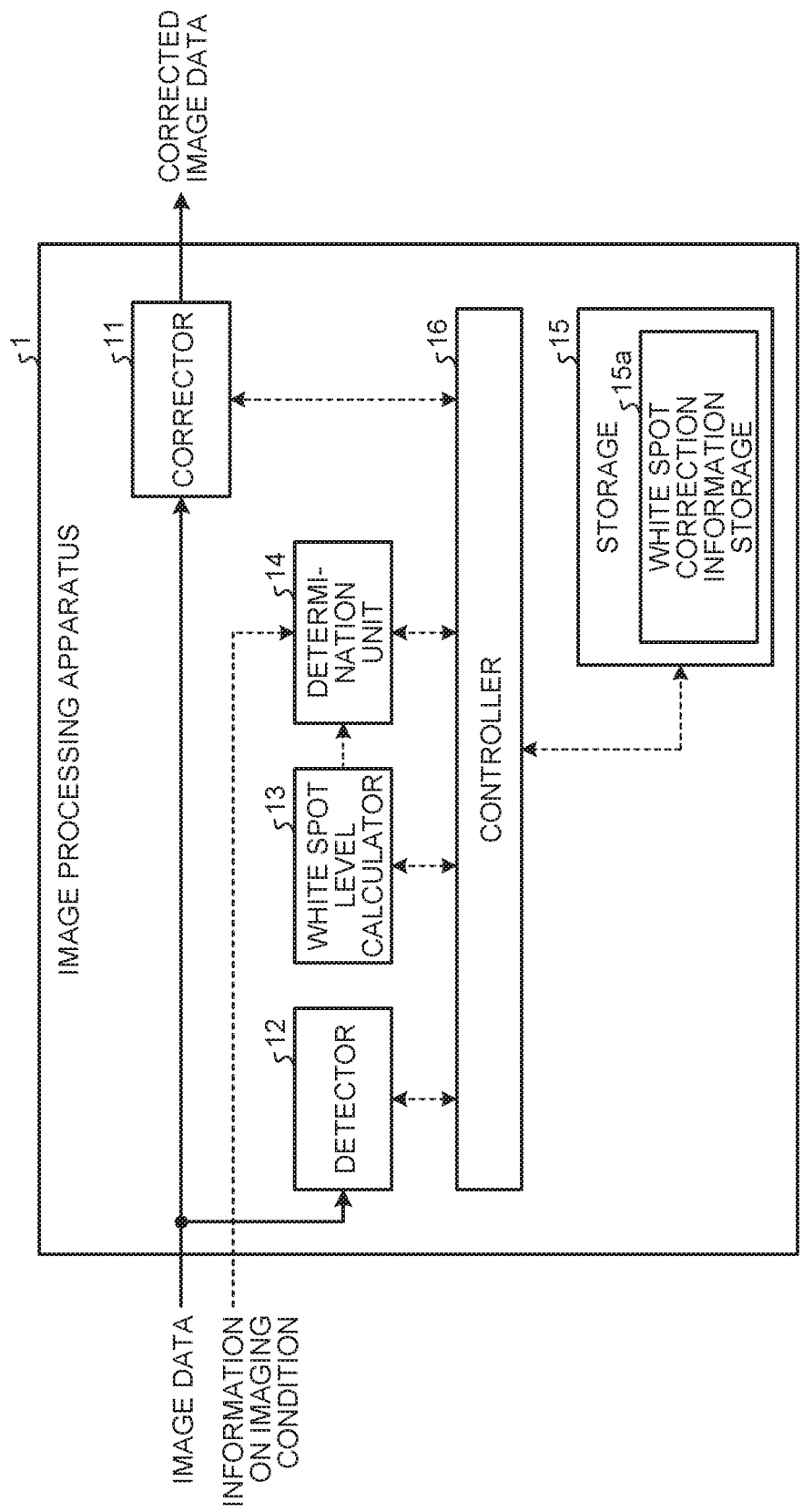
FIG. 1 is a block diagram illustrating a functional configuration of an image processing apparatus according to an embodiment of the disclosure.

FIG. 1 is a block diagram illustrating a functional configuration of an image processing apparatus according to an embodiment of the disclosure. An image processing apparatus 1 according to the embodiment is, for example, an apparatus that acquires image data that is generated by an endoscope and information on imaging conditions (a shutter speed and an exposure time) under which the image data is acquired and that outputs corrected image data obtained by correcting a white spot by performing image processing on the acquired image data. The image data is data containing multiple pixel values obtained by performing photoelectric conversion using multiple pixels that are arrayed in a matrix. The corrected image data that is output from the image processing apparatus 1 may be displayed on an external display device or may be recorded in an external recording device or an external measurement device may perform a measurement process on the corrected image data.

The image processing apparatus 1 includes a corrector 11, a detector 12, a white spot level calculator 13, a determination unit 14, a storage 15, and a controller 16.

The corrector 11 generates image data obtained by performing a correction process on the acquired data and thereby correcting the pixel value of a defective pixel. Specifically, the corrector 11 refers to defective pixel information that is stored in the storage 15 and extracts a defective pixel and then corrects the pixel value of the defective pixel (white spot). The corrector 11, for example, interpolates the pixel value of the defective pixel using the pixel values of pixels surrounding the defective pixel (referred to as surrounding pixels below). When the pixels are arranged in a matrix, the corrector 11 interpolates the pixel value of the defective pixel using the pixel values of eight pixels that are adjacent vertically, horizontally, and obliquely to the defective pixel. The corrector 11, for example, determines an edge direction from the surrounding pixels and uses, as an interpolation value, a statistical value (an average or a median) of the pixel values of the pixels in the determined edge direction. The edge herein refers to a site where the brightness varies widely. The corrector 11 may interpolate the pixel value of the defective pixel using only the pixel values of pixels in a given direction (for example, the horizontal direction) among the vertical, horizontal and oblique directions.

The corrector 11 may perform, as required (according to the setting), signal processing, such as A/D conversion, optical correction, color correction, optical black subtraction, noise reduction, or white balance adjustment, and a communization process of making an alignment with a format in which RGB luminance is set previously.

The detector 12 acquires the image data and detects a position of a defective pixel corresponding to a white spot. Using the pixel value of each pixel, the detector 12 detects a position of a pixel having a pixel value at a white spot level. The detector 12, for example, calculates a difference between a pixel value of a pixel on which detection is to be performed and a statistical value (a median or an average) of pixel values of pixels surrounding the pixel on which detection is to be performed, compares the difference and a threshold that is set previously, and determines whether the pixel is a defective pixel. The detector 12 outputs information on the detected defective pixel to the controller 16.

The white spot level calculator 13 calculates a white spot level of a defective pixel that is stored in the storage 15. Based on a white spot level of the defective pixel in the current frame on which detection is to be performed and a white spot level in a frame that is captured prior to the current frame, for example, a frame immediately previous to the current frame, the white spot level calculator 13 calculates a white spot level of the current frame. Specifically, the white spot level calculator 13 weights the white spot level that is calculated in the current fame and the white spot level in the previous fame, thereby calculating the white spot level in the current frame. The weight used herein may be determined based on the shutter speed or the exposure time or based on variation in pixel value among the surrounding pixels (for example, a statistical value representing variation (dispersion or a standard deviation)). For example, when the pixel values of the surrounding pixels vary widely, the pixel values of the surrounding area containing the pixel whose white spot level is to be calculated are less reliable and thus the weight of the current frame is reduced. When a white spot level is calculated for the first time, a white spot level that is set previously is used as a white spot level of the previous frame.

The determination unit 14 determines whether the defective pixel that is registered in the storage 15 is to be corrected, using the white spot level that is calculated by the white spot level calculator 13. The determination unit 14 compares the white spot level and a threshold that is determined based on the brightness and the exposure time that are calculated from the pixel values near the defective pixel. When the white spot level is above the threshold, the determination unit determines that the corresponding defective pixel is to be corrected.

Figure 2:
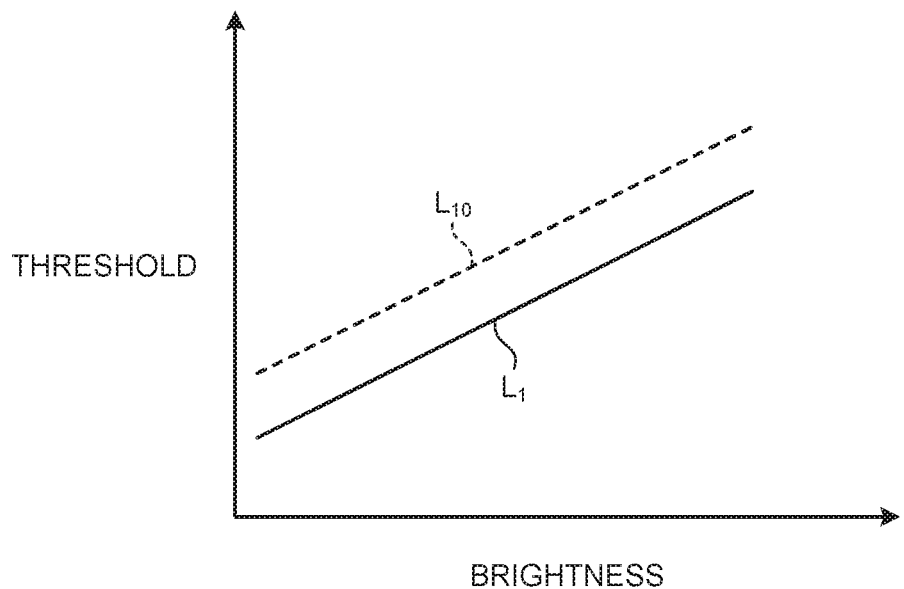
FIG. 2 is a diagram for explaining a threshold that is used in the image processing apparatus according to the embodiment of the disclosure.

FIG. 2 is a diagram for explaining the threshold that is sued in the image processing apparatus according to the embodiment of the disclosure. The graph represented in FIG. 2 shows a relation between the brightness and the threshold. In FIG. 2, the straight line $L_1$ representing a threshold setting straight line that is used when the exposure time is relatively short and the straight line $L_{10}$ represents a reference threshold setting straight line corresponding to an exposure time that is set generally. Whether the straight line $L_1$ is used or the straight line $L_{10}$ is used is determined by a reference exposure time that is set previously. For example, when the currently acquired exposure time is shorter than the reference exposure time, the straight line $L_1$ is used. According to the graphs, on both the straight line $L_1$ and the straight line $L_{10}$, the threshold in the dark case is smaller than the threshold in the bright case. In other words, even at the same white spot level, the darker the pixel is, the more the pixel is less easily excluded from defective pixels to be corrected. In the embodiment, particularly when the exposure time is short, the straight line $L_1$ is used and, even at the same white spot level, the threshold is set smaller than the reference threshold setting straight line (the straight line $L_{10}$). For this reason, in the embodiment, when the exposure time is short, the pixel is regarded as a white spot that should be corrected and is less easily excluded from defective pixels to be corrected compared to general white spot determination.

The storage 15 stores various programs for casing the image processing apparatus 1 to operate and data containing various parameters necessary for operations of the image processing apparatus 1. The storage 15 includes a white spot correction information storage 15a that stores information on defective pixels. In the white spot correction information storage 15a, positional information on defective pixels that are detected by the detector 12 (also referred to as white spot information) is stored. In the white spot correction information storage 15a, when a detection result is input from the controller 16, the defective pixel information is updated according to the detection result.

The storage 15 stores various programs containing an image processing program for executing an image processing method performed by the image processing apparatus 1. The various programs is distributable by being recorded in a computer-readable recording medium, such as a hard disk, a flash memory, a CD-ROM, a DVD-ROM, or a flexible disk. It is also possible to acquire the aforementioned various programs by downloading the various programs via a communication network. The communication network herein is implemented using, for example, an existing public network, a local area network (LAN), or a wide area network (WAN) regardless whether the network is wired or wireless.

The storage 15 having the above-described configuration is implemented using a read only memory (ROM) in which various programs, etc., are installed in advance, a RAM that stores operation parameters and data of each process, a hard disk, etc.

The controller 16 controls driving each component and controls input and output of information to and from each component. The controller 16 stores the detection result (defective pixel information) that is acquired from the detector 12 in the white spot correction information storage 15a and when, on the defective pixel on which the determination unit 14 determines that the defective pixel is not to be corrected, it is determined in successive frames that the defective pixel is not to be corrected, deletes the defective pixel from the white spot correction information storage 15a.

Each of the corrector 11, the detector 12, the white spot level calculator 13, the determination unit 14, and the controller 16 is configured using a general-purpose processor, such as a central processing unit (CPU), or a dedicated processor of various operation circuits that execute specific functions, such as an application specific integrated circuit (ASIC).

Figure 3:
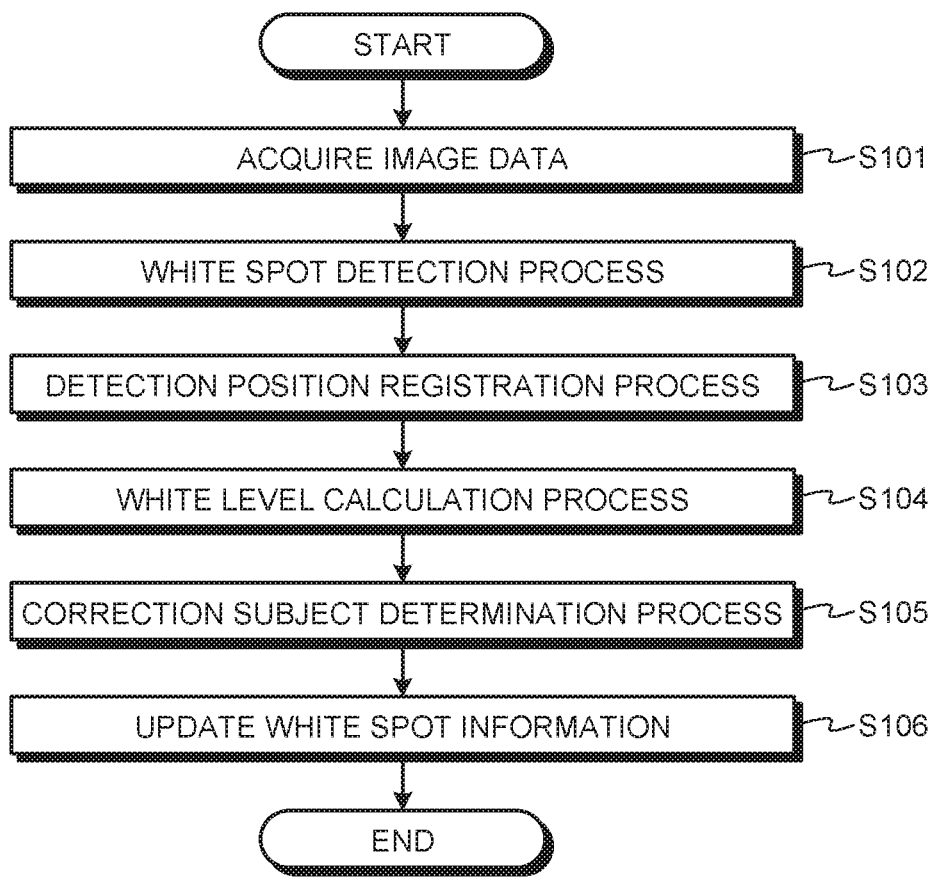
FIG. 3 is a flowchart representing image processing performed by the image processing apparatus according to the embodiment of the disclosure.

A white spot correction determination process that is performed by the image processing apparatus 1 will be described. FIG. 3 is a flowchart representing image processing that is performed by the image processing apparatus according to the embodiment of the disclosure. When image data is input to the image processing apparatus 1, a process of registering a defective pixel to be corrected is executed. Description will be given below on the premise that each unit operates under the control of the controller 16.

When the image data is acquired (step S101), the controller 16 outputs the acquired image data to the corrector 11 and the detector 12. The corrector 11 performs white spot correction on a defective pixel that is stored in the white spot correction information storage 15a (correction step). Positional information on the defective pixel used here is positional information on the defective pixel that is detected using image data that is acquired prior to the image data that is currently acquired, for example, using the immediately previous image data.

At step S102 following step S101, the detector 12 detects a white spot of the acquired image data (detection step). Using the pixel values of the respective pixels, the detector 12 detects a position of a pixel having a pixel value at the white spot level. The detector 12 outputs information on the detected defective pixel to the controller 16.

On acquiring the result of the detection performed by the detector 12, the controller 16 registers the detected position and updates the information in the white spot correction information storage 15a (step S103). The registration process updates the information that is stored in the white spot correction information storage 15a to positional information on the defective pixel based on the image data that is acquired currently.

The white spot level calculator 13 then calculates a white spot level of the defective pixel (step S104: level calculation step). The white spot level calculator 13 calculates a white spot level of the defective pixel after the update at step S103.

At step S105 following step S104, the determination unit 14 determines whether the defective pixel is to be corrected, using the white spot level (determination step). As described above, the determination unit 14 compares the white spot level and a threshold that is determined based on a brightness that is calculated from pixel values close to the defective pixel and an acquired exposure time (refer to FIG. 2). The brightness is a statistical value (an average or a median) of the pixel values close to the defective pixel. When the white spot level is above the threshold, the determination unit 14 determines that the corresponding defective pixel is to be corrected and, when the white spot level is at or under the threshold, the determination unit 14 determines that the corresponding defective pixel is not to be corrected. The determination unit 14 executes the above-described determination process on the defective pixel that is stored in the white spot correction information storage 15a.

Based on the result of the determination made by the determination unit 14, the controller 16 updates the information in the white spot correction information storage 15a (step S106). When the determination unit 14 determines, on the defective pixel on which it is determined that the defective pixel is not to be corrected, that the defective pixel is not to be corrected in multiple frames successively, the controller 16 deletes the defective pixel from the white spot correction information storage 15a. Accordingly, only positional information on defective pixels on which the determination unit 14 determines that the defective pixels are candidates to be corrected is stored in the white spot correction information storage 15a.

According to the flowchart, the positional information on the defective pixels into which the exposure time is taken into account is registered in the white spot correction information storage 15a. Thus, a white spot (defective pixel) that is registered when the exposure time is long is kept being registered without being deleted also when the exposure time is short.

In the above-described embodiment, using a white spot level and a threshold that is determined based on a brightness that is calculated from pixel values close to a defective pixel and an exposure time, it is determined whether the defective pixel that is detected by the detector 12 is to be corrected. The determination process varies, even at the same white spot level, the result of determining whether the defective pixel is excluded from pixels to be corrected according to the exposure time. In the embodiment, particularly when the exposure time is short, the pixel value itself decreases and thus the pixel value is less easily excluded from defective pixels to be corrected. The corrector 11 interpolates the pixel value of the defective pixel from the surrounding pixels in the same fame without conventional correction using weighting based on the white spot level. According to the embodiment, because, when the white spot level varies rapidly, a change occurs in exposure time because, for example, setting of the shutter speed is changed, changing the threshold according to the exposure time makes it possible to appropriately correct a defective pixel even when the white spot level changes rapidly.

Modification 1 of the embodiment will be described with reference to FIG. 4. In the above-described embodiment, the threshold that the determination unit 14 uses is set according to the exposure time. In Modification 1, a threshold is set according to a brightness and a value of gain. In Modification 1, description will be given on the premise that the corrector 11 at least executes a process of correcting a defective pixel and gain adjustment of adjusting the gain of a pixel value. The gain adjustment is set by the user.

Figure 4:
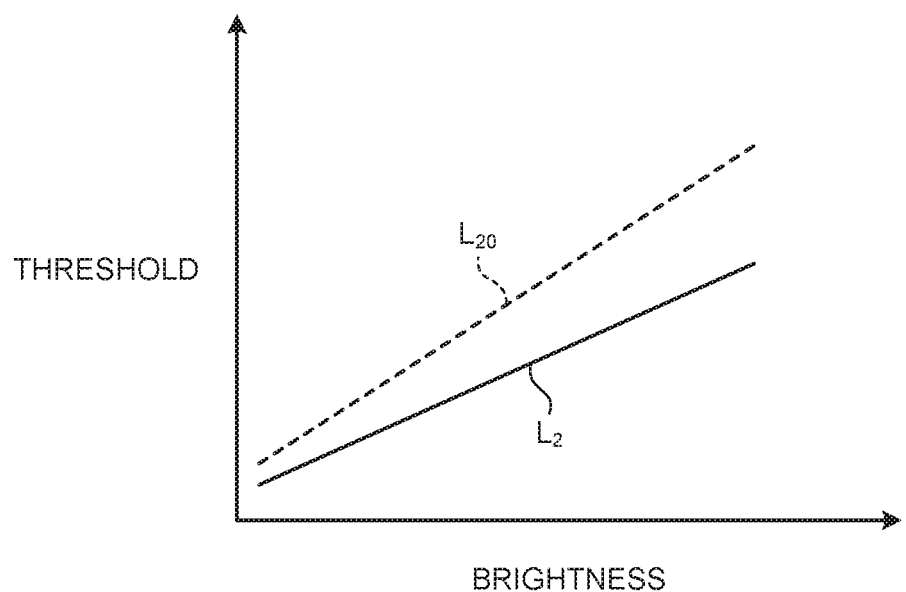
FIG. 4 is a diagram for explaining a threshold that is used in an image processing apparatus according to Modification 1 of the embodiment of the disclosure.

FIG. 4 is a diagram for explaining a threshold that is used in an image processing apparatus according to Modification 1 of the embodiment of the disclosure. The graph represented in FIG. 4 represents the relation between the brightness and the threshold. In FIG. 4, the straight line $L_2$ represents a threshold setting straight line that is used when the value of gain is relatively small and the straight line $L_{20}$ represents a reference threshold setting straight line corresponding to a value of gain that is set generally. Whether the straight line $L_2$ is used or the straight line $L_{20}$ is used is determined according to a reference value of gain that is set previously. For example, when the current value of gain is smaller than the reference value of gain, the straight line $L_2$ is used. According to the graphs, on both the straight line $L_2$ and the straight line $L_{20}$, the threshold increases as the brightness increases. In other words, even at the same white spot level, the darker the pixel is, the more the pixel is less easily excluded from defective pixels to be corrected. In Modification 1, particularly when the value of gain is small, the straight line $L_2$ is used and, even at the same white spot level, the threshold is set smaller than the reference threshold setting straight line (the straight line $L_{20}$). For this reason, in Modification 1, when the value of gain is small, the pixel is regarded as a white spot that should be corrected and is less easily excluded from pixels to be corrected compared to general white spot determination.

In Modification 1, the determination unit 14 compares the white spot level and the threshold that is determined based on the value of gain, thereby determining whether the defective pixel is to be corrected.

In Modification 1 described above, using a white spot level and a threshold that is determined based on a brightness that is calculated from pixel values close to a defective pixel and a value of gain, it is determined whether the defective pixel that is detected by the detector 12 is to be corrected. The brightness calculated herein is a statistical value (such as an average or a median) of pixel values close to the defective pixel. The determination process varies, even at the same white spot level, the result of determining whether the defective pixel is excluded from pixels to be corrected according to the value of gain. In Modification 1, particularly when the value of gain is small, the pixel value itself is small and thus the pixel value is less easily excluded from defective pixels to be corrected. As in the embodiment, the corrector 11 interpolates the pixel value of the defective pixel from the surrounding pixels in the same fame without using conventional correction using weighting based on the white spot level. According to Modification 1, changing the value of gain makes it possible to appropriately correct a defective pixel even when the white spot level changes rapidly.

Modification 2

Modification 2 of the embodiment will be described with reference to FIG. 5. In the above-described embodiment, the threshold that the determination unit 14 uses is set according to the exposure time. In Modification 2, a threshold is set according to a brightness and variation in pixel value among pixels surrounding a defective pixel. The variation is calculated by the determination unit 14 and, when variation is calculated by the white spot level calculator 13, the variation may be used.

Figure 5:
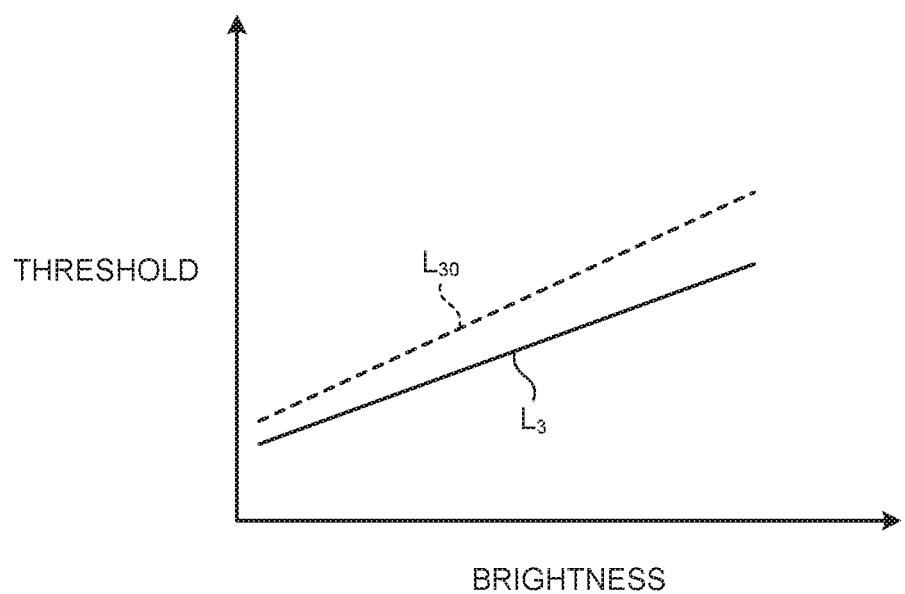
FIG. 5 is a diagram for explaining a threshold that is used in an image processing apparatus according to Modification 2 of the embodiment of the disclosure.

FIG. 5 is a diagram for explaining a threshold that is used by an image processing apparatus according to Modification 2 of the embodiment of the disclosure. The graph represented in FIG. 5 represents the relation between the variation in pixel value among surrounding pixels and the threshold. In FIG. 5, the straight line $L_3$ represents a threshold setting straight line that is used when the variation is small and the straight line $L_{30}$ represents a reference threshold setting straight line that is set for general variation. Whether the straight line $L_3$ is used or the straight line $L_{30}$ is used is determined according to reference variation that is set previously. For example, when the current variation is smaller than the reference variation, the straight line $L_3$ is used. According to the graphs, on both the straight line $L_3$ and the straight line $L_{30}$, the threshold decreases as the variation decreases. In other words, even at the same white spot level, the smaller the variation is, the more the pixel is less easily excluded from defective pixels to be corrected. In Modification 2, particularly when the variation is small, the straight line $L_3$ is used and, even at the same white spot level, the threshold is set smaller than the reference threshold setting straight line (the straight line $L_{30}$). For this reason, in Modification 2, when the variation is small, the pixel is regarded as a white spot that should be corrected and is less easily excluded from pixels to be corrected compared to general white spot determination.

The determination unit 14 compares the white spot level and the threshold that is determined based on the brightness that is calculated from the pixel values close to the defective pixel and the calculated variation, thereby determining whether the defective pixel is to be corrected. The brightness is, for example, a statistical value (such as an average or a median) of the pixels close to the defective pixel.

In Modification 2 described above, using a white spot level and a threshold that is determined based on a brightness that is calculated from pixel values close to a defective pixel and variation in pixel value, it is determined whether the defective pixel that is detected by the detector 12 is to be corrected. The determination process varies, even at the same white spot level, the result of determining whether the defective pixel is excluded from pixels to be corrected according to the variation. In Modification 2, particularly when the variation is small, the pixel values of the surrounding pixels for calculating a white spot level are highly reliable and thus the pixel value is less easily excluded from pixels to be corrected. As in the embodiment, the corrector 11 interpolates the pixel value of the defective pixel from the surrounding pixels in the same fame without using conventional correction using weighting based on the white spot level. According to Modification 2, when the white spot level varies rapidly, the exposure time varies because, for example, setting of the shutter speed is changed, and therefore changing the threshold according to the exposure time makes it possible to appropriately correct a defective pixel even when the white spot level changes rapidly.

Modification 3

Modification 3 of the embodiment will be described. In the above-described embodiment, the threshold that the determination unit 14 uses may be set with the variation described in Modification 2 being further taken into account in addition to the exposure time. In Modification 3, a threshold is determined by the exposure time and the variation. Furthermore, as in the embodiment and Modification 2, it is preferable that an area where the exposure time is small and/or an area where the variation is small be regarded as a white spot that should be corrected and be less easily excluded from defective pixels to be corrected compared to a reference that is set generally.

The above-described embodiment has been described on the premise that the controller 16 deletes a defective pixel on which the determination unit 14 determines that the defective pixel is not to be correct from the white spot correction information storage 15a. Alternatively, a process in which the defective pixel is not deleted, information representing that the defective pixel is not to be corrected is added to the defective pixel, and the defective pixel is not corrected during defective pixel correction may be performed. Without storing information on all defective pixels that are detected by the detector 12, information on the final defective pixel that is determined by the determination unit 14 may be stored in the white spot correction information storage 15a.

The above-described embodiment has been described on the premise that the corrector 11 corrects a defective pixel from positional information on the defective pixel that is registered based on image data of the previous frame. Alternatively, when the processing time is sufficient, for example, because real time processing is not required, a defective pixel may be corrected from the positional information on the defective pixel that is registered based on the image data of the current frame. In this case, in the flowchart represented in FIG. 3, the corrector 11 executes the correction process (step S101) using information on the latest defective pixel after step S106. In any of the cases, it is preferable that the information on the latest defective pixel that is stored in the white spot correction information storage 15a be used.

The embodiment has been described on the premise that a threshold is set using the threshold setting straight line (straight line $L_1$). Alternatively, a threshold may be set using the reference threshold setting straight line $L_{10}$ that is set generally.

The embodiment has been described on the premise that the image processing apparatus 1 uses image data that is captured by an endoscope. As the endoscope, any one of a flexible endoscope that is inserted into a subject and captures images of living tissue, an industrial endoscope that observes characteristics of a material, a capsule endoscope, a fiberscope, and an endoscope using an optical endoscope, such as an optical viewing tube, having an eye peace to which a camera head is connected may be used. For example, image data captured using, for example, a digital steel camera may be used.

According to the embodiment described above, a processing apparatus that is connected via the Internet may execute part of the process.

As described above, the image processing apparatus, the image processing method, and the image processing program according to the disclosure are useful in appropriately correcting a defective pixel even when the white spot level varies rapidly.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus for processing image data containing multiple pixel values obtained by performing photoelectric conversion using multiple pixels, the image apparatus comprising:
   a processor comprising hardware, the processor being configured to:
   detect a defective pixel in which a defect occurs from among the multiple pixels;
   based on a first level that is calculated in a first frame corresponding to the defective pixel and on a second level that is calculated in a second frame that is captured prior to the first frame, calculate a level of a pixel value of the defective pixel;
   compare the calculated level of the pixel value of the defective pixel with a threshold to determine whether a defective pixel that is stored in a storage is to be corrected, the threshold being determined based on a brightness that is calculated from pixel values close to a defective pixel and on any one of an exposure time of image data corresponding to a defective pixel on which a determination is to be made, a value of gain, and variation in pixel value among pixels surrounding the defective pixel on which a determination is to be made; and
   by using pixel values of pixels surrounding the determined defective pixel that is to be corrected, interpolate the pixel value of the determined defective pixel that is to be corrected.

2. The image processing apparatus according to claim 1, wherein the processor is configured to, using a threshold that is determined based on the brightness and the exposure time, determine whether the defective pixel is to be corrected, and
   wherein the threshold obtained when the exposure time is short is smaller than the threshold obtained when the exposure time is long.

3. The image processing apparatus according to claim 1, wherein the processor is configured to, using a threshold that is determined based on the brightness and the value of gain, determine whether the defective pixel is to be corrected, and
   wherein the threshold obtained when the value of gain is small is smaller than the threshold obtained when the value of gain is large.

4. The image processing apparatus according to claim 1, wherein the processor is configured to, using a threshold that is determined based on the brightness and the variation, determine whether the defective pixel is to be corrected, and
wherein the threshold obtained when the variation is small is smaller than the threshold obtained when the variation is large.

5. The image processing apparatus according to claim 1, wherein the processor is configured to, based on a difference between a pixel value of a pixel on which a determination is to be made and a statistical value of pixel values of pixels surrounding the pixel on which a determination is to be made, determine whether the pixel on which a determination is to be made is the defective pixel.

6. An image processing method for processing image data containing multiple pixel values obtained by performing photoelectric conversion using multiple pixels, the image processing method comprising:
   detecting a defective pixel in which a defect occurs from among the multiple pixels;
   based on a first level that is calculated in a first frame corresponding to the defective pixel and on a second level that is calculated in a second frame that is captured prior to the first frame, calculating a level of a pixel value of the defective pixel;
   comparing the calculated level of the pixel value of the defective pixel with a threshold to determine whether a defective pixel that is stored in a storage is to be corrected, the threshold being determined based on a brightness that is calculated from pixel values close to a defective pixel and on any one of an exposure time of image data corresponding to a defective pixel on which a determination is to be made, a value of gain, and variation in pixel value among pixels surrounding the defective pixel on which a determination is to be made; and
   by using pixel values of pixels surrounding the determined defective pixel that is to be corrected, interpolating the pixel value of the determined defective pixel that is to be corrected.

7. A non-transitory computer-readable recording medium with an executable program stored thereon for processing image data containing multiple pixel values obtained by performing photoelectric conversion using multiple pixels, wherein the program causes a processor to execute:
   detecting a defective pixel in which a defect occurs from among the multiple pixels;
   based on a first level that is calculated in a first frame corresponding to the defective pixel and on a second level that is calculated in a second frame that is captured prior to the first frame, calculating a level of a pixel value of the defective pixel;
   comparing the calculated level of the pixel value of the defective pixel with a threshold to determine whether a defective pixel that is stored in a storage is to be corrected, the threshold being determined based on a brightness that is calculated from pixel values close to a defective pixel and on any one of an exposure time of image data corresponding to a defective pixel on which a determination is to be made, a value of gain, and variation in pixel value among pixels surrounding the defective pixel on which a determination is to be made; and
   by using pixel values of pixels surrounding the determined defective pixel that is to be corrected, interpolating the pixel value of the determined defective pixel that is to be corrected.

* * * * *